United States Patent
Tani et al.

(10) Patent No.: US 12,431,297 B2
(45) Date of Patent: Sep. 30, 2025

(54) ELECTROLYTIC CAPACITOR HAVING AN EXTERNAL ELECTRODE LAYER WITH A VARYING THICKNESS AND METHOD FOR MANUFACTURING THE SAME

(71) Applicant: Murata Manufacturing Co., Ltd., Nagaokakyo (JP)

(72) Inventors: Satoshi Tani, Nagaokakyo (JP); Tomohiro Noda, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 131 days.

(21) Appl. No.: 18/361,108

(22) Filed: Jul. 28, 2023

(65) Prior Publication Data
US 2023/0368980 A1    Nov. 16, 2023

Related U.S. Application Data

(63) Continuation of application No. PCT/JP2022/003492, filed on Jan. 31, 2022.

(30) Foreign Application Priority Data

Feb. 2, 2021    (JP) .................................. 2021-014977

(51) Int. Cl.
*H01G 9/012*    (2006.01)
*H01G 9/00*    (2006.01)
(Continued)

(52) U.S. Cl.
CPC ........... *H01G 9/012* (2013.01); *H01G 9/0029* (2013.01); *H01G 9/10* (2013.01); *H01G 9/15* (2013.01)

(58) Field of Classification Search
None
See application file for complete search history.

(56) References Cited

U.S. PATENT DOCUMENTS

| | | |
|---|---|---|
| 9,514,884 B2 | 12/2016 | Lee et al. |
| 11,295,902 B2 | 4/2022 | Yamazaki et al. |

(Continued)

FOREIGN PATENT DOCUMENTS

| | | |
|---|---|---|
| JP | H06291380 A | 10/1994 |
| JP | 3276113 B1 | 4/2002 |

(Continued)

OTHER PUBLICATIONS

International Search Report in PCT/JP2022/003487, mailed Apr. 26, 2022, 3 pages.

(Continued)

*Primary Examiner* — Eric W Thomas
(74) *Attorney, Agent, or Firm* — ArentFox Schiff LLP

(57) ABSTRACT

An electrolytic capacitor that includes: a resin molded body that includes a stack including at least one capacitor element and a sealing resin sealing a periphery of the stack; a cathode external electrode on the outer surface of the resin molded body and electrically connected to a conductive layer of the at least one capacitor element; and an anode external electrode on the outer surface of the resin molded body and having a first electrode layer in direct contact with a core and a porous portion of a valve-action metal substrate of the at least one capacitor element, wherein, in a normal direction of the outer surface of the resin molded body, a first thickness of a first portion of the first electrode layer on the core is larger than a second thickness of a second portion of the first electrode layer on the porous portion.

20 Claims, 4 Drawing Sheets

(51) Int. Cl.
*H01G 9/10* (2006.01)
*H01G 9/15* (2006.01)

(56) References Cited

U.S. PATENT DOCUMENTS

| | | | |
|---|---|---|---|
| 2002/0001169 A1* | 1/2002 | Shiraishi | H01G 9/26 |
| | | | 361/523 |
| 2005/0195558 A1* | 9/2005 | Goldberger | H01G 9/042 |
| | | | 361/523 |
| 2010/0165547 A1 | 7/2010 | Kuranuki et al. | |
| 2014/0292141 A1 | 10/2014 | Nishisaka et al. | |
| 2014/0347783 A1 | 11/2014 | Kisumi et al. | |
| 2015/0136463 A1 | 5/2015 | Lee et al. | |
| 2020/0211784 A1* | 7/2020 | Tamatani | H01G 9/07 |
| 2020/0266005 A1 | 8/2020 | Suzuki et al. | |
| 2020/0335284 A1 | 10/2020 | Yamazaki et al. | |
| 2021/0383976 A1* | 12/2021 | Tamatani | H01G 9/012 |

FOREIGN PATENT DOCUMENTS

| | | |
|---|---|---|
| JP | 2005-217126 A | 8/2005 |
| JP | 2007073883 A | 3/2007 |
| JP | 2007208112 A | 8/2007 |
| JP | 2009076872 A | 4/2009 |
| JP | 2011108875 A | 6/2011 |
| JP | 2011153329 A | 8/2011 |
| JP | 2014209551 A | 11/2014 |
| JP | 2015-097248 A | 5/2015 |
| JP | 2020141059 A | 9/2020 |
| JP | 2020-178098 A | 10/2020 |
| JP | 2020194825 A | 12/2020 |
| WO | 2008081585 A1 | 7/2008 |
| WO | 2013128957 A1 | 9/2013 |
| WO | 2014136168 A1 | 9/2014 |
| WO | 2019065870 A1 | 4/2019 |
| WO | 2020174847 A1 | 9/2020 |

OTHER PUBLICATIONS

International Search Report in PCT/JP2022/003492, mailed Mar. 29, 2022, 3 pages.
International Search Report in PCT/JP2022/003495, mailed Mar. 29, 2022, 3 pages.

* cited by examiner

Cross-sectional view taken along line A-A

ELECTROLYTIC CAPACITOR HAVING AN EXTERNAL ELECTRODE LAYER WITH A VARYING THICKNESS AND METHOD FOR MANUFACTURING THE SAME

CROSS REFERENCE TO RELATED APPLICATIONS

The present application is a continuation of International application No. PCT/JP2022/003492, filed Jan. 31, 2022, which claims priority to Japanese Patent Application No. 2021-014977, filed Feb. 2, 2021, the entire contents of each of which are incorporated herein by reference.

TECHNICAL FIELD

The present disclosure relates to electrolytic capacitors and methods for manufacturing electrolytic capacitors.

BACKGROUND ART

Patent Literature 1 discloses a chip capacitor.
In Patent Literature 1, a metal film extended along an exposed surface is formed by plating an exposed portion where an internal electrode provided inside a chip substrate is exposed, and then a conductive resin paste is applied to the exposed surface to form a side electrode.

Patent Literature 2 discloses a solid electrolytic capacitor.

Patent Literature 2 discloses that a part of an anode body is exposed on the outside of a sealing body, and the exposed part is covered with a plating layer and electrically connected to a conductive elastic body for an anode through the plating layer.

Patent Literature 1: JP 2007-073883 A
Patent Literature 2: JP 3276113 B

SUMMARY OF THE INVENTION

In the techniques described in Patent Literatures 1 and 2, the metal layer of the electrode exposed portion is a plating layer formed by plating, and a resin electrode layer is provided on the plating layer to achieve low equivalent series resistance (ESR) and high reliability.

However, since the plating layer formed on the electrode exposed portion is formed with a uniform thickness on the exposed portion, there is a problem that the area of adhesion with the resin electrode layer is insufficient and the ESR cannot be sufficiently lowered. Further, since the bonding strength between the plating layer and the resin electrode layer is also weak, a problem may occur in terminal-fixing strength when an electronic component is mounted.

Therefore, an object of the present disclosure is to provide an electrolytic capacitor that can sufficiently reduce ESR and has a high terminal-fixing strength, and a method for manufacturing an electrolytic capacitor.

An electrolytic capacitor of the present disclosure is an electrolytic capacitor that includes: a resin molded body that includes a stack having at least one capacitor element and a sealing resin for sealing a periphery of the stack; and an anode external electrode and a cathode external electrode on an outer surface of the resin molded body.

The at least one capacitor element includes: a valve-action metal substrate having a core and a porous portion along a surface of the core, an end of the valve-action metal substrate being exposed on the outer surface of the resin molded body; a dielectric layer on the porous portion; a solid electrolyte layer on the dielectric layer; and a conductive layer on the solid electrolyte layer. The cathode external electrode on the outer surface of the resin molded body is electrically connected to the conductive layer, and the anode external electrode on the outer surface of the resin molded body and has a first electrode layer in direct contact with the core and the porous portion of the valve-action metal substrate.

In a normal direction of the outer surface of the resin molded body, a first thickness of a first portion of the first electrode layer on the core of the valve-action metal substrate is larger than a second thickness of a second portion of the first electrode layer on the porous portion of the valve-action metal substrate.

The method for manufacturing an electrolytic capacitor of the present disclosure includes: forming the first electrode layer on the outer surface of the resin molded body by an aerosol deposition method.

According to the present disclosure, it is possible to provide an electrolytic capacitor that can sufficiently reduce ESR and has a high terminal-fixing strength, and a method for manufacturing an electrolytic capacitor.

DETAILED DESCRIPTION OF THE PREFERRED EMBODIMENTS

An electrolytic capacitor and a method for manufacturing the electrolytic capacitor of the present disclosure are described below.

The present invention is not limited to the following preferred embodiments, and may be suitably modified without departing from the gist of the present invention. Combinations of two or more preferred features described in the following preferred embodiments are also within the scope of the present invention.

Figure 1:
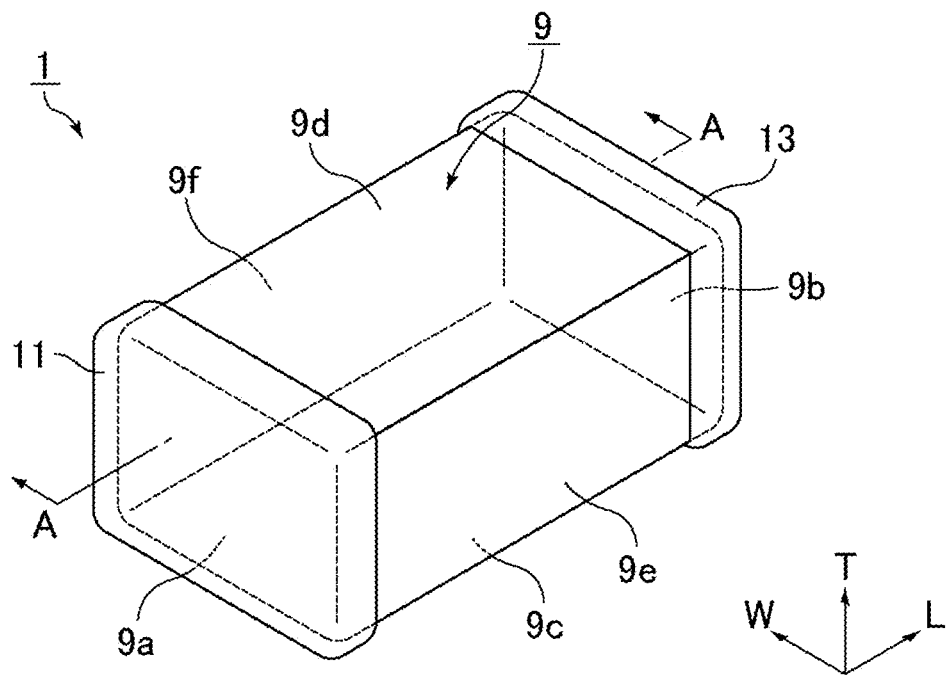
FIG. 1 is a schematic perspective view of an example of an electrolytic capacitor of the present disclosure.

FIG. 1 is a schematic perspective view of an example of the electrolytic capacitor of the present disclosure.

FIG. 1 shows a resin molded body 9 of an electrolytic capacitor 1.

The shape of the resin molded body constituting the electrolytic capacitor of the present disclosure is not limited, and any three-dimensional shape can be used. The resin molded body preferably has a cuboid shape. Further, the cuboid shape is not a word meaning a complete cuboid, and a surface forming the resin molded body may have a taper without being orthogonal to other surfaces, or may have a shape with chamfered corners.

FIG. 1 shows a cuboid resin molded body 9, and the resin molded body 9 has a length direction (L direction), a width direction (W direction), and a thickness direction (T direction).

The resin molded body 9 includes outer surfaces: a first end surface 9a and a second end surface 9b which are opposite to each other in the length direction. An anode external electrode 11 is formed on the first end surface 9a, and a cathode external electrode 13 is formed on the second end surface 9b.

The resin molded body 9 includes outer surfaces: a bottom surface 9c and a top surface 9d which are opposite to each other in the thickness direction.

The resin molded body 9 also includes outer surfaces: a first side surface 9e and a second side surface 9f which are opposite to each other in the width direction.

Herein, a plane along the length direction (L direction) and the thickness direction (T direction) of the electrolytic capacitor or the resin molded body is referred to as an "LT plane", a plane along the length direction (L direction) and the width direction (W direction) is referred to as an "LW plane", and a plane along the width direction (W direction) and the thickness direction (T direction) is referred to as a "WT plane".

In the following description, as for the outer surfaces of the resin molded body, a plane on which the anode external electrode is provided is referred to as a "first end surface", and a plane on which the cathode external electrode is provided is referred to as a "second end surface". In the outer surfaces of the resin molded body, the surface on which the anode external electrode is provided may be the same as the surface on which the cathode external electrode is provided.

Figure 2:
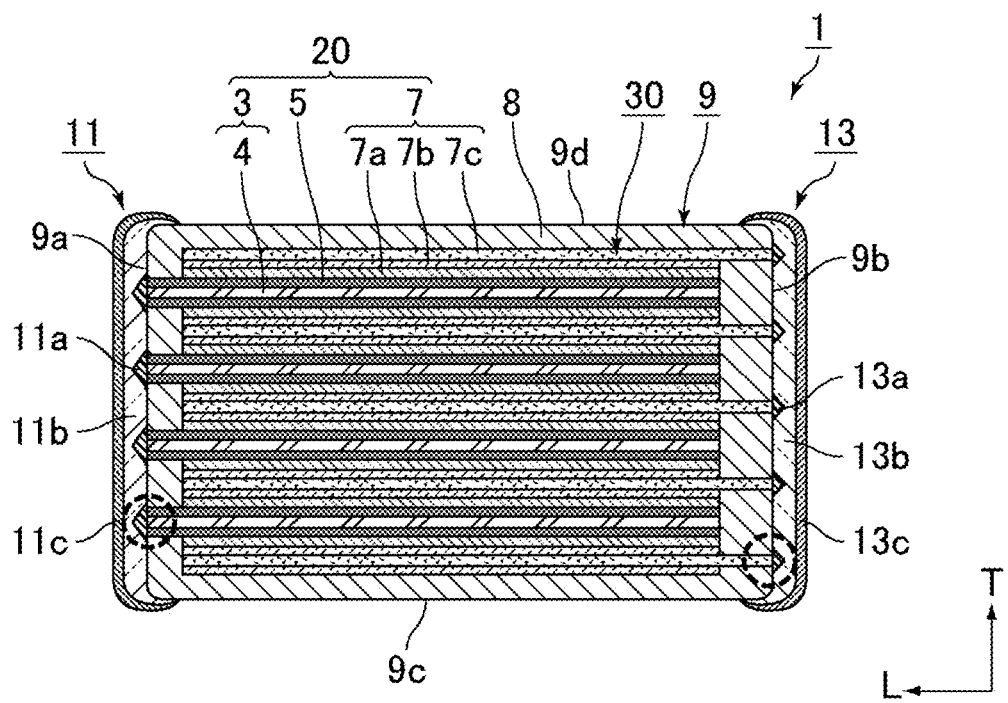
FIG. 2 is a cross-sectional view taken along line A-A of the electrolytic capacitor shown in FIG. 1.

FIG. 2 is a cross-sectional view taken along line A-A of the electrolytic capacitor shown in FIG. 1.

A capacitor element 20 includes an anode 3 having a dielectric layer 5 on a surface thereof and a cathode 7 opposite to the anode 3.

Multiple such capacitor elements 20 are stacked to form a stack 30, and the stack 30 is sealed in a sealing resin 8 to obtain the resin molded body 9. In the stack 30, the stacked capacitor elements 20 may be bonded to each other via a conductive adhesive (not shown). The number of capacitor element 20 included in the stack 30 may be one.

The anode external electrode 11 is formed on the first end surface 9a of the resin molded body 9, and the anode external electrode 11 is electrically connected to the anode 3 exposed on the first end surface 9a.

The cathode external electrode 13 is formed on the second end surface 9b of the resin molded body 9, and the cathode external electrode 13 is electrically connected to the cathode 7 exposed on the second end surface 9b.

A second end surface 9b-side end of a valve-action metal substrate 4 of the capacitor element 20 is sealed with the sealing resin 8, and the valve-action metal substrate 4 is not in direct contact with a solid electrolyte layer 7a or a conductive layer 7b. When the second end surface 9b-side end of the valve-action metal substrate 4 is insulated, for example, by being covered with the dielectric layer 5, the second end surface 9b-side end of the valve-action metal substrate 4 may be covered with the solid electrolyte layer 7a and the conductive layer 7b.

Figure 3:
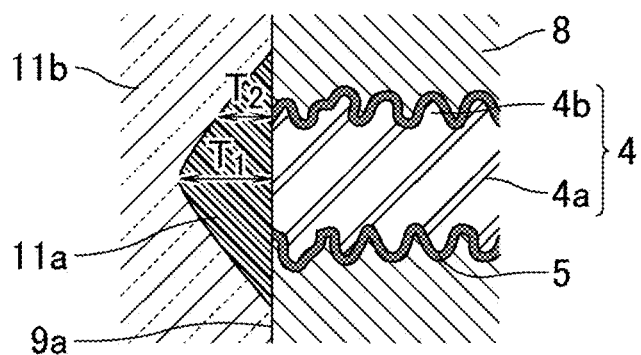
FIG. 3 is a schematic cross-sectional view showing the vicinity of a valve-action metal substrate on a first end surface of a resin molded body.

FIG. 3 is a schematic cross-sectional view showing the vicinity of a valve-action metal substrate on a first end surface of a resin molded body.

FIG. 3 is also a schematic cross-sectional view showing a region surrounded by a dotted line in a lower left portion of FIG. 2.

The valve-action metal substrate 4 has a core 4a and a porous portion 4b formed along the surface of the core 4a. An end of the valve-action metal substrate 4 is exposed on the first end surface 9a of the resin molded body 9.

The dielectric layer 5 is formed on the surface of the porous portion 4b.

Examples of the valve-action metal constituting the valve-action metal substrate include elemental metals such as aluminum, tantalum, niobium, titanium, zirconium, magnesium, and silicon, and alloys containing these metals. Of these, aluminum and an aluminum alloy are preferred.

The valve-action metal substrate may have any shape, but it is preferably flat, and is more preferably in the form of foil. Preferably, the porous portion is an etched layer that has been etched with hydrochloric acid or the like.

The thickness of the valve-action metal substrate before etching is preferably 60 μm to 180 μm. The thickness of the non-etched valve-action metal substrate (core) after etching is preferably 10 μm to 70 μm. The thickness of the porous portion is designed according to the withstand voltage and capacitance required for the electrolytic capacitor, but the thickness of the porous portion including the porous portions on both sides of the valve-action metal substrate is preferably 10 μm to 120 μm.

Preferably, the dielectric layer is formed of an oxide film of the valve-action metal. For example, when aluminum foil is used as a valve-action metal substrate, the aluminum foil is anodized in an aqueous solution containing boric acid, phosphoric acid, adipic acid, a sodium salt or an ammonium salt thereof, or the like, whereby an oxide film that serves as a dielectric layer can be formed.

The dielectric layer is formed along the surface of the porous portion, whereby pores (recesses) are formed in the dielectric layer. The thickness of the dielectric layer is designed according to the withstand voltage and capacitance required for the electrolytic capacitor, but the thickness of the dielectric layer is preferably 3 nm to 200 nm.

The anode external electrode 11 is provided on the first end surface 9a of the resin molded body 9.

The anode external electrode 11 includes a first electrode layer 11a in direct contact with the core 4a of the valve-action metal substrate 4 and the porous portion 4b. In a normal direction of the outer surface of the resin molded body (the thickness of the first end surface of the resin molded body in the normal direction), a thickness of a portion of the first electrode layer 11a formed on the core 4a of the valve-action metal substrate 4 is larger than a thickness of a portion of the first electrode layer formed on the porous portion 4b of the valve-action metal substrate 4.

The thickness of the first electrode layer 11a formed on each of the core 4a of the valve-action metal substrate 4 and the porous portion 4b of the valve-action metal substrate 4 is determined as the thickness at the thickest portion in each of the portions. In FIG. 3, the thicknesses of the portions of the first electrode layer 11a formed on the core 4a of the valve-action metal substrate 4 and the porous portion 4b of the valve-action metal substrate 4 are indicated by double-headed arrows $T_1$ and $T_2$.

Directions indicated by double-headed arrows $T_1$ and $T_2$ are normal directions of the first end surface 9a which is the outer surface of the resin molded body 9.

When the first electrode layer 11a is formed on the first end surface 9a of the resin molded body 9, the first electrode layer 11a is likely to be formed on the core 4a, and the first electrode layer 11a is unlikely to be formed on the porous portion 4b which is brittle compared to the core 4a. Accordingly, the thickness of the first electrode layer 11a on the core 4a increases.

When the thickness of the first electrode layer on the core is large, an adhesion area with the second electrode layer formed on the first electrode layer is increased as compared to the case where the first electrode layer is flat, and the adhesion with the second electrode layer is improved. Consequently, the ESR can be sufficiently reduced. Since the bonding strength between the first electrode layer and the second electrode layer is high, the terminal-fixing strength when the electronic component is mounted can also be increased.

The thickness of the first electrode layer formed on the core is preferably 0.3 µm to 30 µm.

When the thickness of the first electrode layer is in the above range, the ESR can be further reduced, and the terminal-fixing strength when the electronic component is mounted can be further increased.

The thickness of the first electrode layer formed on the porous portion is not limited as long as it is smaller than the thickness of the first electrode layer formed on the core portion.

Preferably, the first electrode layer has a wedge-shaped cross section, in a cross-section being orthogonal to each of the outer surface of the resin molded body (first end surface of the resin molded body) on which the valve-action metal substrate is exposed and a main surface of the valve-action metal substrate, and including the first electrode layer. FIG. 3 shows that the cross section of the first electrode layer 11a has a wedge shape.

When the first electrode layer has a wedge-shaped cross section, the bonding strength with the second electrode layer formed on the first electrode layer is improved by the anchor effect, whereby the terminal-fixing strength is improved.

The "wedge shape" herein means a shape which has a bottom in contact with the valve-action metal substrate in the cross section and in which a width orthogonal to a direction away from the bottom (height direction) gradually narrows. The shape of the top of the wedge shape is not limited, and may be sharp, rounded, or flat. The top of the wedge shape is seemed to be approximately smooth, but it may have irregularities in a microscopic view.

As shown in FIG. 3, the first electrode layer 11a may be in contact with the sealing resin 8.

The first electrode layer 11a is preferably an electrode layer containing at least one selected from the group consisting of Cu, Ni, Sn, Ag, Zn, and Au. In particular, the electrode layer is preferably an electrode layer containing at least one of Cu or Ni.

The first electrode layer 11a is preferably an electrode layer formed on the first end surface 9a as the outer surface of the resin molded body 9 by the aerosol deposition method. The method of forming the first electrode layer by the aerosol deposition method will be described later.

Preferably, the anode external electrode 11 further includes a second electrode layer 11b formed on the first electrode layer 11a.

The second electrode layer 11b is preferably a conductive resin electrode layer containing a conductive component and a resin component.

Preferably, the conductive component mainly includes a component such as Ag, Cu, Ni, or Sn, and the resin component mainly includes an epoxy resin, a phenolic resin, or the like.

In particular, the second electrode layer is preferably a conductive resin electrode layer containing Ag. The conductive resin electrode layer containing Ag can reduce ESR owing to the low specific resistance of Ag.

Preferably, the second electrode layer is a printed resin electrode layer formed by screen printing an electrode paste.

When the second electrode layer is a printed resin electrode layer, the external electrodes can be made flat, as compared to the case where the resin electrode is formed by dipping in an electrode paste. In other words, the external electrodes have better thickness uniformity.

The electrode paste may contain an organic solvent, and the organic solvent is preferably a glycol ether-based solvent. Examples include diethylene glycol monobutyl ether and diethylene glycol monophenyl ether.

The electrode paste may also contain an additive, if necessary. The additive is effective in adjusting the rheology, especially thixotropy, of the electrode paste. The amount of the additive contained is preferably less than 5 wt % relative to the weight of the electrode paste.

An outer plating layer may be formed on the surface of second electrode layer. FIG. 2 shows a third electrode layer 11c as an outer plating layer provided on the surface of the second electrode layer 11b.

Preferably, the third electrode layer is a Ni plating layer or a Sn plating layer.

When the third electrode layer includes two layers, the third electrode layer may include a first outer plating layer formed on the surface of the second electrode layer and a second outer plating layer formed on the surface of the first outer plating layer.

Preferably, the first outer plating layer is a Ni plating layer and the second outer plating layer is a Sn plating layer.

The configuration related to the anode 3 has been described so far, and subsequently, the configuration related to the cathode 7 and other configurations constituting the resin molded body will be described with reference to FIG. 2.

The cathode 7 of the capacitor element 20 is a stack including the solid electrolyte layer 7a on the dielectric layer 5, the conductive layer 7b on the solid electrolyte layer 7a, and a cathode lead-out layer 7c on the conductive layer 7b.

The electrolytic capacitor including a solid electrolyte layer as part of the cathode can be considered to be a solid electrolytic capacitor.

Examples of materials defining the solid electrolyte layer include conductive polymers having a skeleton of pyrrole, thiophene, aniline, or the like. A conductive polymer having a thiophene skeleton is, for example, poly(3,4-ethylenedioxythiophene) (PEDOT), or may be PEDOT:PSS which is a complex with a dopant (poly(styrene sulfonate) (PSS)).

The solid electrolyte layer is formed by, for example, a method in which a polymerized film of poly(3,4-ethylenedioxythiophene) or the like is formed on a surface of the dielectric layer using a treatment liquid containing a monomer such as 3,4-ethylenedioxythiophene or a method in which a dispersion of a polymer such as poly(3,4-ethylenedioxythiophene) is applied to a surface of the dielectric layer and dried. Preferably, a solid electrolyte layer for an inner layer for filling the pores (recesses) is formed first, and then a solid electrolyte layer for an outer layer for covering the entire dielectric layer is formed.

The solid electrolyte layer can be formed in a predetermined region by applying the treatment liquid or dispersion to the dielectric layer by, for example, sponge transfer, screen printing, spray coating, dispensing, or inkjet printing. The thickness of the solid electrolyte layer is preferably 2 μm to 20 μm.

The conductive layer is provided to electrically and mechanically connect the solid electrolyte layer to the cathode lead-out layer. For example, the conductive layer is preferably a carbon layer, a graphene layer, a silver layer, a copper layer, or a nickel layer formed by applying a conductive paste such as a carbon paste, a graphene paste, a silver paste, a copper paste, or a nickel paste. Further, the conductive layer may be, for example, a composite layer in which a silver layer, a copper layer, or a nickel layer is provided on a carbon layer or a graphene layer, or may be a mixed layer formed by applying a paste mixture in which a carbon paste or a graphene paste is mixed with a silver paste, a copper paste, or a nickel paste.

The conductive layer can be formed on the solid electrolyte layer by applying a conductive paste such as a carbon paste by, for example, sponge transfer, screen printing, spray coating, dispensing, or inkjet printing. Preferably, a cathode lead-out layer formed in a subsequent step is stacked while the conductive layer is viscous before drying. The thickness of the conductive layer is preferably 2 μm to 20 μm.

The cathode lead-out layer can be formed from a metal foil.

In the case of the metal foil, the metal foil preferably contains at least one metal selected from the group consisting of Al, Cu, Ag, and an alloy mainly containing any of these metals. When the metal foil contains any of these metals, the metal foil can have a lower resistance value, and the ESR can be reduced.

Alternatively, the metal foil may be one whose surface is coated with carbon or titanium by a film forming method such as sputtering or vapor deposition. Use of carbon-coated Al foil is more preferred. The thickness of the metal foil is not limited, but it is preferably 20 μm to 50 μm, in view of better handling during production, smaller size, and lower ESR.

Figure 4:
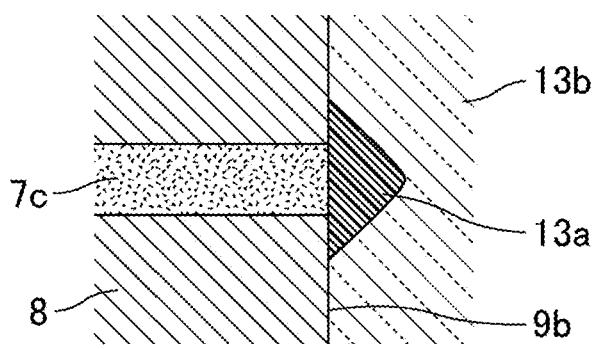
FIG. 4 is a schematic cross-sectional view showing the vicinity of a cathode lead-out layer on a second end surface of the resin molded body.

FIG. 4 is a schematic cross-sectional view showing the vicinity of a cathode lead-out layer on a second end surface of a resin molded body.

FIG. 4 is also a schematic cross-sectional view showing a region surrounded by a dotted line in a lower right portion of FIG. 2.

The cathode lead-out layer 7c as a metal foil is exposed on the second end surface 9b of the resin molded body 9.

The cathode external electrode 13 is provided on the second end surface 9b as the outer surface of the resin molded body 9.

The cathode external electrode 13 may include a first electrode layer 13a that is in direct contact with the cathode lead-out layer 7c. It is possible to use the first electrode layer 13a having the same configuration as the first electrode layer 11a formed on the first end surface 9a of the resin molded body 9.

Preferably, the first electrode layer has a wedge-shaped cross section, in a cross-section being orthogonal to each of the outer surface of the resin molded body (second end surface of the resin molded body) on which the cathode lead-out layer is exposed and a main surface of the cathode lead-out layer, and including the first electrode layer. FIG. 4 shows that the cross section of the first electrode layer 13a has a wedge shape.

Similarly to the anode external electrode 11, the cathode external electrode 13 may include a second electrode layer 13b formed on the first electrode layer 13a, or may include a third electrode layer 13c.

As the configurations of the second electrode layer 13b and the third electrode layer 13c, configurations similar to the configurations of the second electrode layer 11b and the third electrode layer 11c in the anode external electrode 11 can be used.

The sealing resin 8 defining the resin molded body 9 contains at least a resin, and preferably contains a resin and a filler. Preferably, examples of the resin include insulating resins, such as epoxy resins, phenolic resins, polyimide resins, silicone resins, polyamide resins, and liquid crystal polymers. The resin molded body 9 may include two or more kinds of insulating resins. The sealing resin 8 can be used in the form of either a solid resin or a liquid resin. Preferably, examples of the filler include inorganic particles such as silica particles, alumina particles, and metal particles. Use of a material obtained by adding silica particles to a solid epoxy resin and/or a phenolic resin is more preferred.

When a solid sealing material is used, preferably, the molding method of the resin molded body uses a resin mold such as a compression mold or a transfer mold. Use of a compression mold is more preferred. When a liquid sealing material is used, use of a molding method such as dispensing or printing is preferred. Preferably, a compression mold is used to seal the stack 30 of the capacitor elements 20 each including the anode 3, the dielectric layer 5, and the cathode 7 in the sealing resin 8 to obtain the resin molded body 9.

Figure 5:
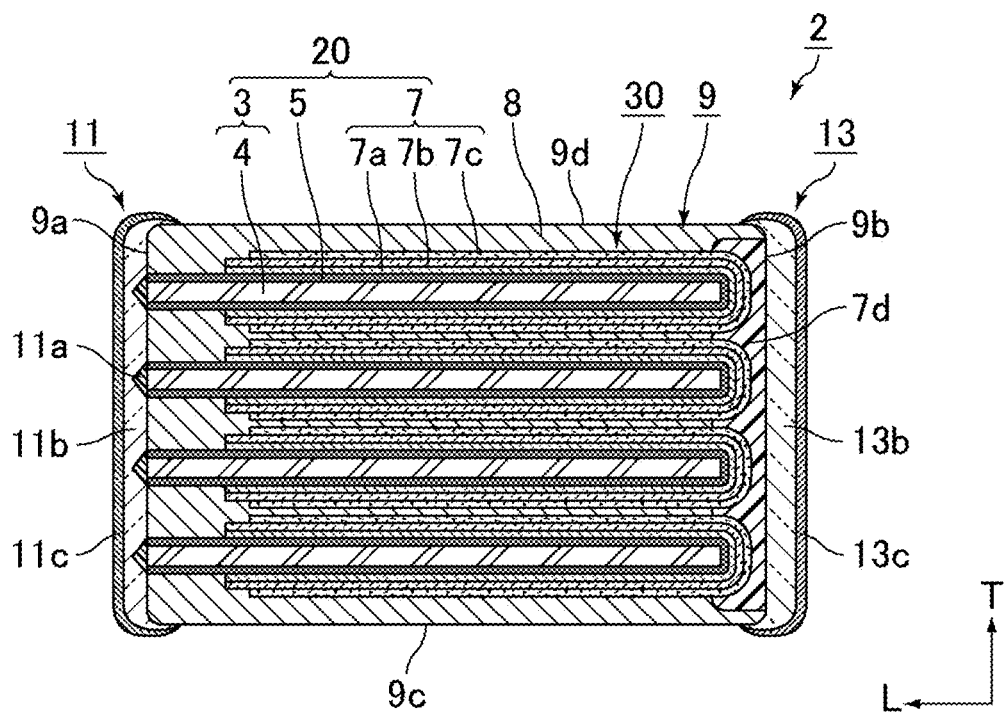
FIG. 5 is a schematic cross-sectional view of another example of the electrolytic capacitor of the present disclosure.

FIG. 5 is a schematic cross-sectional view of another example of the electrolytic capacitor of the present disclosure.

In the electrolytic capacitor 2 shown in FIG. 5, the cathode lead-out layer 7c and the cathode lead-out portion 7d are formed from an electrode paste instead of a metal foil.

In this case, the cathode lead-out layer can be formed in a predetermined region by applying an electrode paste to the conductive layer by, for example, sponge transfer, screen printing, spray coating, dispensing, or inkjet printing. The electrode paste is preferably one mainly containing Ag, Cu, or Ni. The cathode lead-out layer formed from an electrode paste can make the cathode lead-out layer thinner than the cathode lead-out layer formed from metal foil. In the case of screen printing, the cathode lead-out layer can have a thickness of 2 μm to 20 μm.

When the cathode lead-out layer 7c and the cathode lead-out portion 7d are formed from an electrode paste, the second electrode layer 13b can be formed by screen printing of the electrode paste without providing the first electrode layer on the cathode side.

The cathode lead-out layer 7c of each of the capacitor elements 20 is collected as the cathode lead-out portion 7d near the second end surface 9b and exposed on the second end surface 9b.

The cathode lead-out portion 7d can also be formed from the same electrode paste as the cathode lead-out layer 7c. The electrode pastes respectively constituting the cathode lead-out portion 7d and the cathode lead-out layer 7c may have different compositions.

When the cathode lead-out layer 7c and the cathode lead-out portion 7d are formed from an electrode paste, the adhesion force to the second electrode layer 13b formed by screen printing of the electrode paste is improved.

Although not shown in FIG. 5, an insulating mask may be provided on the anode side. In that case, the insulating mask may be provided on the surface of the dielectric layer.

In another example of the electrolytic capacitor of the present disclosure shown in FIG. 5, the solid electrolyte layer may be formed in a predetermined region by applying the treatment liquid or dispersion described above onto the dielectric layer by dipping. Similarly, the conductive layer may be formed by applying a conductive paste such as a carbon paste onto the solid electrolyte layer by dipping.

Next, the following describes an example of a method for manufacturing an electrolytic capacitor of the present disclosure.

When the electrolytic capacitor of the present disclosure is manufactured, the first electrode layer is preferably formed on the outer surface of the resin molded body by an aerosol deposition method, a gas deposition method, or the like. In particular, the first electrode layer is preferably formed on the outer surface of the resin molded body by an aerosol deposition method.

Hereinafter, a method for manufacturing an electrolytic capacitor including: forming a first electrode layer on a first end surface as an outer surface of a resin molded body by an aerosol deposition method will be described. The forming a first electrode layer is referred to as a "first electrode layer forming step".

First, a resin molded body in which the valve-action metal substrate is exposed on the first end surface is prepared.

Figure 6:
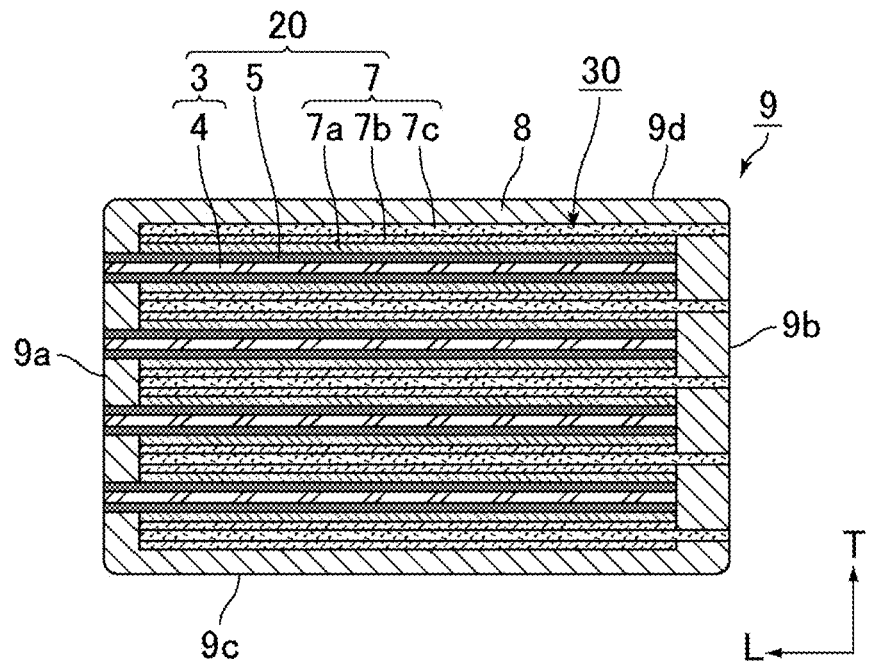
FIG. 6 is a schematic cross-sectional view showing an example of the resin molded body.

FIG. 6 is a schematic cross-sectional view showing an example of the resin molded body.

In the first electrode layer forming step, the first electrode layer is formed by injecting fine metal particles to the first end surface of the resin molded body and causing the fine metal particles to collide with the first end surface at a pressure lower than atmospheric pressure.

When the first electrode layer is formed by this step, an external electrode can be formed without using a plating process which is likely to corrode the internal electrode, and thus LC failure due to a plating solution can be suppressed.

Figure 7:
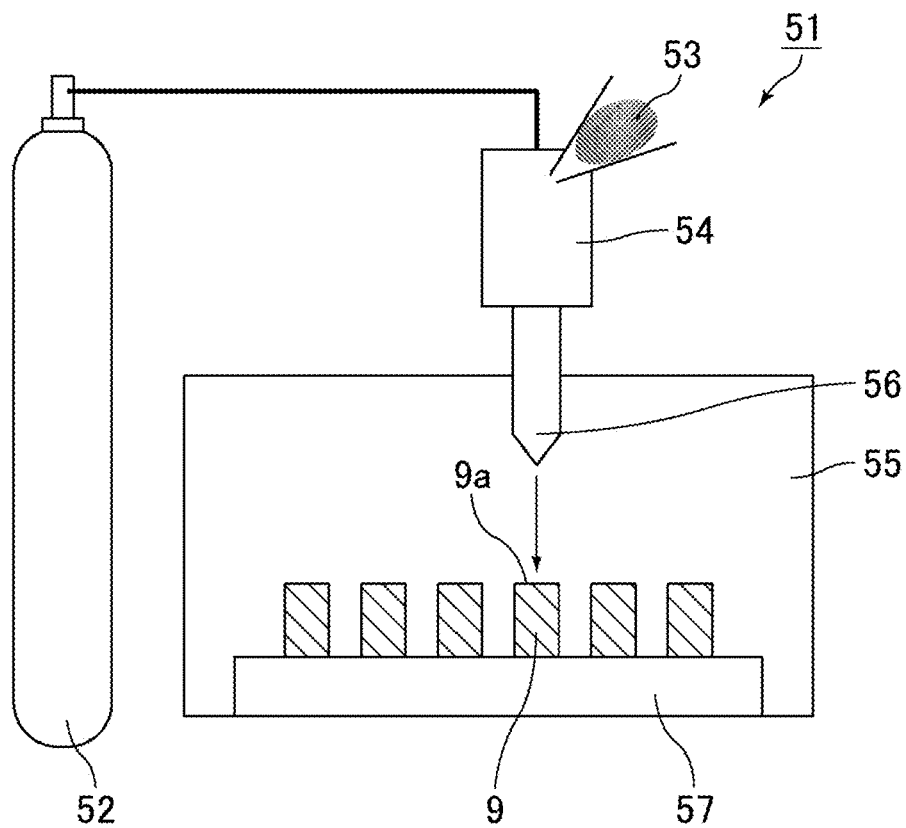
FIG. 7 is a schematic view showing a step of forming a first electrode layer by an aerosol deposition method.

FIG. 7 is a schematic view showing a step of forming the first electrode layer by an aerosol deposition method.

FIG. 7 shows an aerosol deposition device 51. The aerosol deposition device 51 includes a cylinder containing a carrier gas 52, an aerosol generator 54 for generating aerosol into which the carrier gas 52 and fine metal particles 53 are introduced, a chamber 55 into which aerosol is introduced, and a stage 57 on which the resin molded bodies 9 are arranged and fixed with the first end surfaces 9a facing upward.

In the aerosol deposition method, the fine metal particles 53 are injected from a nozzle 56 provided at the tip of the aerosol generator 54 and collide with the first end surface 9a of the resin molded body 9 to form the first electrode layer.

When the first electrode layer is formed by the aerosol deposition method, the thickness of the first electrode layer can be reduced, and the bonding strength between the resin molded body and the first electrode layer can be increased. Furthermore, according to the aerosol deposition method, the film formation can be performed at a low speed and a low temperature, thereby enabling damage to the resin molded body to be reduced.

The first electrode layer forming step is performed at a pressure lower than atmospheric pressure. By vacuuming the inside of the chamber, the inside of the chamber can be brought to a pressure lower than the atmospheric pressure. The pressure in the chamber is preferably 10 Pa to 1000 Pa. The pressure in the chamber can be adjusted by increasing or decreasing the gas flow rate. In a case where the gas flow rate is increased such that the pressure in the chamber is, for example, 100 Pa or more, the film formation speed can be increased. As a result, the film formation cost can be reduced.

The first electrode layer forming step is preferably performed at 100° C. or lower, and is more preferably performed at ambient temperature. Since it is not necessary to increase the temperature, damage to the resin molded body can be reduced, and the aerosol deposition device can be simplified by performing at ambient temperature.

The ambient temperature may be any temperature as long as it is a temperature in a working environment, and may be, for example, 10° C. or higher and 30° C. or lower.

The fine metal particles are preferably fine particles containing at least one selected from the group consisting of Cu, Ni, Sn, Ag, Zn, and Au, more preferably fine particles containing at least one of Cu or Ni.

By changing the particle size of the fine metal particles, the scanning speed of the nozzle, and the injection amount of the fine metal particles per unit time, the ease of adhesion of the fine metal particles and the thickness of the first electrode layer can be adjusted.

From the viewpoint of the ease of adhesion of the metal fine particles and the thickness of the first electrode layer, the particle size (D50) of the fine metal particles is preferably less than 5 µm, more preferably less than 3 µm.

The D50 of the fine metal particles is a median diameter based on the volume distribution measured by a laser diffraction/scattering method.

As a device for measuring the D50 of fine metal particles, for example, MT3300 manufactured by MicrotracBEL Corp. can be used.

After the first electrode layer is formed, a second electrode layer forming step of forming a second electrode layer containing a conductive component and a resin component on the first electrode layer may be performed.

In the second electrode layer forming step, a printed resin electrode layer as the second electrode layer is preferably formed by performing screen printing of the electrode paste.

When the second electrode layer is formed by screen printing of the electrode paste, the external electrodes can be made flat, as compared to the case where the second electrode layer is formed by dipping in an electrode paste. In other words, the external electrode has better thickness uniformity.

After the second electrode layer is formed, a third electrode layer forming step of forming a third electrode layer on the second electrode layer by plating may be performed.

The first electrode layer forming step may also be performed on the second end surface of the resin molded body, similarly on the first end surface of the resin molded body, to form the first electrode layer on the second end surface.

Through the step, the first electrode layer 13a as shown in FIG. 4 can be formed on the second end surface 9b of the resin molded body.

Thereafter, the second electrode layer 13b and the third electrode layer 13c can be formed, similarly on the first end surface of the resin molded body.

In particular, when the cathode lead-out layer is a metal foil, providing the first electrode layer by the first electrode layer forming step is effective because the adhesion force between the metal foil and the first electrode layer can be improved.

EXAMPLES

The following shows examples of the electrolytic capacitor of the present disclosure in which the ESR and terminal-fixing strength were evaluated. The present invention is not limited to these examples.

Examples 1 to 5

A stack having a configuration shown in FIG. 1 and FIG. 2 was sealed in a sealing resin containing an epoxy resin and silica particles to obtain a resin molded body.

A first electrode layer was formed on a first end surface of the resin molded body by an aerosol deposition method (AD method). Cu particles or Ni particles were used as the fine metal particles, and the thickness of the first electrode layer was changed by changing film formation conditions in the aerosol deposition method.

The type (metal type) of the fine metal particles and the thickness of the first electrode layer in each of the Examples are shown in Table 1.

mm/sec until the displacement reached 10 mm, and held for 5 seconds. Then, the change rate in capacitance was measured.

When the bonding strength between the first electrode layer and the second electrode layer is weak, the capacitor element and the external electrode are opened by peeling, and the capacitance is changed. Therefore, the measurement of the change rate in capacitance can be substituted for the evaluation of the terminal-fixing strength.

The results of these evaluation tests are shown in Table 1.

TABLE 1

| | Method of forming first electrode layer | Metal type | First electrode layer thickness | | ESR 100 kHz | Change rate in capacitance after bending test |
|---|---|---|---|---|---|---|
| | | | Core | Porous portion | | |
| Example 1 | AD method | Cu | 3 μm | 0.5 μm | 30 mΩ | −0.5% |
| Example 2 | AD method | Cu | 15 μm | 5 μm | 28 mΩ | −1.1% |
| Example 3 | AD method | Cu | 30 μm | 10 μm | 27 mΩ | −1.2% |
| Example 4 | AD method | Ni | 3 μm | 1 μm | 28 mΩ | −0.9% |
| Example 5 | AD method | Cu | 0.3 μm | 0.1 μm | 32 mΩ | −1.3% |
| Comparative Exmaple 1 | Plating | Ni/Ag | 5 μm/5 μm | 0 μm | 45 mΩ | −5.0% |

A first electrode layer was also formed on a second end surface of the resin molded body, similarly on the first end surface.

Thereafter, a Ag-containing electrode paste was applied to the end surfaces (the first end surface and the second end surface) of the resin molded body by screen printing, and was thermally cured. Thus, second electrode layers were formed. Further, a Ni plating layer and a Sn plating layer as third electrode layers were formed on a surface of each of the second electrode layers to prepare an electrolytic capacitor.

Comparative Example 1

A zincate treatment was performed in which first and second end surfaces of the resin molded body were etched with an acid containing nitric acid as a main component, and a zinc film was formed. Ni plating and Ag plating were performed to form a first electrode layer.

A second electrode layer and a third electrode layer were formed in the same manner as in Example 1, and thus an electrolytic capacitor was produced.

[Measurement of Film Thickness and Electrical Properties]

The thickness of the first electrode layer of the electrolytic capacitor was measured nondestructively by a fluorescent X-ray coating thickness gauge (SFT9450, manufactured by Hitachi High-Tech Science Corporation). The thickness obtained by this measurement method is about a half of the physical film thickness measured by polishing the cross section of the LT plane of the electrolytic capacitor and using SEM/EDS. Therefore, the thickness twice the thickness measured by the fluorescent X-ray coating thickness gauge is regarded as the thickness of the first electrode layer, and is shown in Table 1.

The ESR (mΩ) at 100 kHz was measured with an LCR meter (E4980A available from KEYSIGHT). The ESR was measured as an average value of the results of measuring 10 electrolytic capacitors.

[Measurement of Capacity after Bending Test]

Each of the electrolytic capacitors was mounted on a glass epoxy substrate, and the glass epoxy substrate was bent at 1

Figure 8:
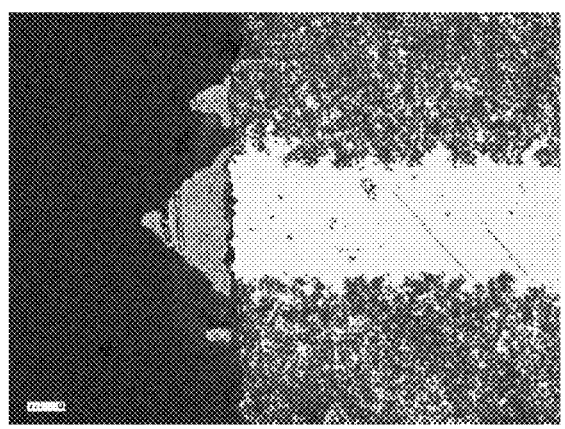
FIG. 8 is an observation photograph of the vicinity of an anode-side end surface of an electrolytic capacitor of Example 3.

FIG. 8 is an observation photograph of the vicinity of an anode-side end surface of an electrolytic capacitor of Example 3. It can be seen that a wedge-shaped electrode layer is formed as the first electrode layer. It can also be seen that the thickness of the portion of the first electrode layer formed on the core of the valve-action metal substrate is larger than the thickness of the portion of the first electrode layer formed on the porous portion of the valve-action metal substrate.

In each of the Examples in which the first electrode layer was formed by the AD method and the thickness of the first electrode layer on the core was large, the ESR was low and the change in capacitance after the bending test was also small. Even when the first electrode layer was formed of Ni as shown in Example 4, the same effect as in the case of Cu was observed.

On the other hand, in Comparative Example 1, the first electrode layer was formed by plating, the ESR was high, and the change in capacitance after the bending test was also large.

REFERENCE SIGNS LIST 1, 2 electrolytic capacitor
3 anode
4 valve-action metal substrate
4 a core
4b porous portion
5 dielectric layer
7 cathode
7a solid electrolyte layer
7b conductive layer
7c cathode lead-out layer
7d cathode lead-out portion
8 sealing resin
9 resin molded body
9a first end surface of resin molded body (outer surface of resin molded body)
9b second end surface of resin molded body (outer surface of resin molded body)

9c bottom surface of resin molded body (outer surface of resin molded body)
9d top surface of resin molded body (outer surface of resin molded body)
9e first side surface of resin molded body (outer surface of resin molded body)
9f second side surface of resin molded body (outer surface of resin molded body)
11 anode external electrode
11a, 13a first electrode layer
11b, 13b second electrode layer
11c, 13c third electrode layer
13 cathode external electrode
20 capacitor element
30 stack
51 aerosol deposition device
52 carrier gas
53 fine metal particles
54 aerosol generator
55 chamber
56 nozzle
57 stage

The invention claimed is:

1. An electrolytic capacitor comprising:
a resin molded body that includes a stack having at least one capacitor element and a sealing resin for sealing a periphery of the stack, the at least one capacitor element including:
a valve-action metal substrate having a core and a porous portion along a surface of the core, an end of the valve-action metal substrate being exposed on an and outer surface of the resin molded body;
a dielectric layer on the porous portion;
a solid electrolyte layer on the dielectric layer; and
a conductive layer on the solid electrolyte layer;
a cathode external electrode on the outer surface of the resin molded body and electrically connected to the conductive layer; and
an anode external electrode on the outer surface of the resin molded body and having a first electrode layer in direct contact with the core and the porous portion of the valve-action metal substrate and in direct contact with the sealing resin, wherein
in a normal direction of the outer surface of the resin molded body, a first thickness of a first portion of the first electrode layer on the core of the valve-action metal substrate is larger than a second thickness of a second portion of the first electrode layer on the porous portion of the valve-action metal substrate.

2. The electrolytic capacitor according to claim 1, wherein the first thickness of the first portion of the first electrode layer on the core of the valve-action metal substrate is 0.3 μm to 30 μm.

3. The electrolytic capacitor according to claim 1, wherein the first electrode layer has a wedge-shaped cross section in a cross-section orthogonal to each of the outer surface of the resin molded body on which the valve-action metal substrate is exposed and a main surface of the valve-action metal substrate.

4. The electrolytic capacitor according to claim 3, wherein the cathode external electrode includes a first cathode electrode layer in direct contact with the conductive layer, the first cathode electrode layer having a wedge-shaped cross section.

5. The electrolytic capacitor according to claim 1, wherein the first electrode layer contains at least one selected from the group consisting of Cu, Ni, Sn, Ag, Zn, and Au.

6. The electrolytic capacitor according to claim 1, wherein the anode external electrode further includes a second electrode layer on the first electrode layer.

7. The electrolytic capacitor according to claim 6, wherein the second electrode layer is a conductive resin electrode layer.

8. The electrolytic capacitor according to claim 7, wherein the second electrode layer contains Ag.

9. The electrolytic capacitor according to claim 6, wherein the anode external electrode further includes a third electrode layer on the second electrode layer.

10. The electrolytic capacitor according to claim 1, wherein the cathode external electrode includes a first cathode electrode layer in direct contact with the conductive layer, the first cathode electrode layer having a wedge-shaped cross section in a cross-section orthogonal to each of the outer surface of the resin molded body on which the conductive layer is exposed and a main surface of the conductive layer.

11. A method for manufacturing an electrolytic capacitor, the method comprising:
providing a resin molded body that includes a stack having at least one capacitor element and a sealing resin that seals a periphery of the stack, the at least one capacitor element including:
a valve-action metal substrate having a core and a porous portion along a surface of the core, an end of the valve-action metal substrate being exposed on an outer surface of the resin molded body;
a dielectric layer on the porous portion;
a solid electrolyte layer on the dielectric layer; and
a conductive layer on the solid electrolyte layer;
forming a cathode external electrode on the outer surface of the resin molded body so as to be electrically connected to the conductive layer; and
forming an anode external electrode on the outer surface of the resin molded body and having a first electrode layer in direct contact with the core and the porous portion of the valve-action metal substrate, wherein the first electrode layer is formed on the outer surface of the resin molded body by an aerosol deposition method such that, in a normal direction of the outer surface of the resin molded body, a first thickness of a first portion of the first electrode layer on the core of the valve-action metal substrate is larger than a second thickness of a second portion of the first electrode layer on the porous portion of the valve-action metal substrate.

12. The method for manufacturing the electrolytic capacitor according to claim 11, wherein the first electrode layer is formed such that the first thickness of the first portion of the first electrode layer on the core of the valve-action metal substrate is 0.3 μm to 30 μm.

13. The method for manufacturing the electrolytic capacitor according to claim 11, wherein the first electrode layer is formed such that the first electrode layer has a wedge-shaped cross section in a cross-section orthogonal to each of the outer surface of the resin molded body on which the valve-action metal substrate is exposed and a main surface of the valve-action metal substrate.

14. The method for manufacturing the electrolytic capacitor according to claim 13, wherein the forming of the cathode external electrode includes forming a first cathode electrode layer in direct contact with the conductive layer, the first cathode electrode layer having a wedge-shaped cross section.

15. The method for manufacturing the electrolytic capacitor according to claim 11, wherein the first electrode layer contains at least one selected from the group consisting of Cu, Ni, Sn, Ag, Zn, and Au.

16. The method for manufacturing the electrolytic capacitor according to claim 11, wherein the forming of the anode external electrode further includes forming a second electrode layer on the first electrode layer.

17. The method for manufacturing the electrolytic capacitor according to claim 16, wherein the second electrode layer is a conductive resin electrode layer.

18. The method for manufacturing the electrolytic capacitor according to claim 17, wherein the second electrode layer contains Ag.

19. The method for manufacturing the electrolytic capacitor according to claim 16, wherein the forming of the anode external electrode further includes forming a third electrode layer on the second electrode layer.

20. The method for manufacturing the electrolytic capacitor according to claim 11, wherein the forming of the cathode external electrode includes forming a first cathode electrode layer in direct contact with the conductive layer, the first cathode electrode layer having a wedge-shaped cross section in a cross-section orthogonal to each of the outer surface of the resin molded body on which the conductive layer is exposed and a main surface of the conductive layer.

* * * * *